United States Patent
Lu et al.

(10) Patent No.: US 10,405,182 B2
(45) Date of Patent: Sep. 3, 2019

(54) SYSTEMS DEVICES AND PROCESSES TO SUPPORT MOBILE DEVICE MANAGEMENT OF MULTIPLE CONTAINERS IN VIRTUALIZATION ENVIRONMENT

(71) Applicants: Jinghui Lu, London (CA); Yin Tan, Waterloo (CA); Yuri Poeluev, Petersburg (CA)

(72) Inventors: Jinghui Lu, London (CA); Yin Tan, Waterloo (CA); Yuri Poeluev, Petersburg (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 91 days.

(21) Appl. No.: 15/199,826

(22) Filed: Jun. 30, 2016

(65) Prior Publication Data

US 2018/0007556 A1    Jan. 4, 2018

(51) Int. Cl.
| | |
|---|---|
| *H04W 12/08* | (2009.01) |
| *G06F 21/60* | (2013.01) |
| *G06F 21/53* | (2013.01) |
| *H04W 88/02* | (2009.01) |

(52) U.S. Cl.
CPC ............ *H04W 12/08* (2013.01); *G06F 21/53* (2013.01); *G06F 21/606* (2013.01); *H04W 88/02* (2013.01)

(58) Field of Classification Search
CPC ...... H04W 12/08; H04W 88/02; G06F 21/606
See application file for complete search history.

(56) References Cited

U.S. PATENT DOCUMENTS

| | | | | |
|---|---|---|---|---|
| 9,405,562 | B2 * | 8/2016 | Kellerman | H04N 21/4437 |
| 2004/0210773 | A1 * | 10/2004 | Markosi, III | G06F 21/316 |
| | | | | 726/22 |
| 2014/0123265 | A1 * | 5/2014 | Borzycki | G06F 21/6218 |
| | | | | 726/8 |
| 2017/0257357 | A1 | 9/2017 | Wang et al. | |
| 2017/0308401 | A1 * | 10/2017 | Argenti | G06F 17/30598 |
| 2017/0357516 | A1 * | 12/2017 | Tan | G06F 9/545 |

FOREIGN PATENT DOCUMENTS

| | | |
|---|---|---|
| CN | 104036202 A | 9/2014 |
| CN | 104798355 A | 7/2015 |
| CN | 105099706 A | 11/2015 |

* cited by examiner

*Primary Examiner* — Mohammed Waliullah
(74) *Attorney, Agent, or Firm* — Norton Rose Fulbright Canada LLP

(57) ABSTRACT

Systems and processes for mobile device management (MDM) implement scoped MDM policies. A mobile device has containers to isolate data and processes on the mobile device from the others of the containers. The scoped MDM policies involve container level commands and device level commands. The mobile device has a first agent residing in a first container and a controller residing within a second container. The controller executes a first device level command to control access to the resources of the mobile device for all containers. The first agent or the controller executes a first container level command to control access to the resources of the mobile device by only the first container.

30 Claims, 17 Drawing Sheets

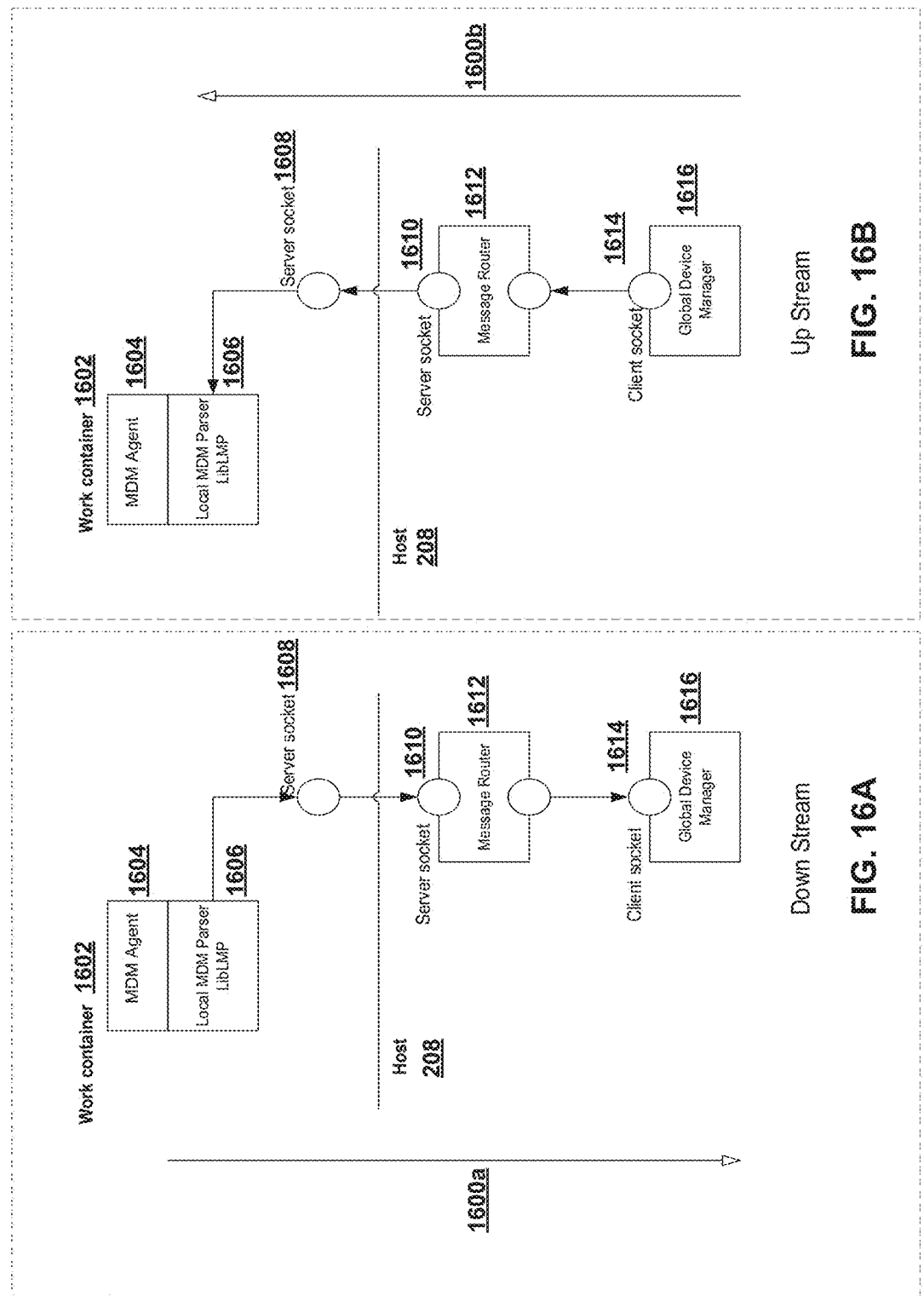

SYSTEMS DEVICES AND PROCESSES TO SUPPORT MOBILE DEVICE MANAGEMENT OF MULTIPLE CONTAINERS IN VIRTUALIZATION ENVIRONMENT

FIELD

The improvements generally relate to the field of mobile device management and isolating data and processes on a mobile device.

BACKGROUND

An organization may permit employees and contractors to use personally owned technology, such as mobile devices, for work and to access information and applications. An organization may permit employees and contractors to use corporate owned technology for personal use. An organization can implement different policies to govern usage of mobile devices in the workplace, such as Bring Your Own Device (BYOD) policies and Corporate Owned Personally Enabled (COPE) policies. Mobile devices configure containers to isolate a portion of a user's mobile device for work use from another portion of the user's mobile device for personal use. Mobile device management (MDM) systems manage usage and resources of mobile devices, such as smartphones, tablet computers, laptops and other computing devices. An example MDM system is implemented using a third-party mobile application that manages the mobile device. Third-party mobile applications can restrict a user's ability to interact with device resources.

SUMMARY

In accordance with another aspect, there is provided a process for management of a mobile device. The mobile device has a plurality of containers, each container of the plurality of containers isolating data and processes on the mobile device from other containers of the plurality of containers, the plurality of containers including a first virtual container. The process involves receiving a first device level command at the mobile device and receiving a first container level command at the mobile device. The process involves executing, by a first agent residing in the first virtual container of the plurality of containers, the first container level command to control access to resources of the mobile device by only the first virtual container. The process further involves executing, by a controller residing on the mobile device, the first device level command to control access to the resources of the mobile device by at least two of the plurality of containers.

In some embodiments, the controller resides within a host container of the plurality of containers of the mobile device.

In some embodiments, the process involves receiving a second container level command at the mobile device and executing, by the controller, the second container level command to control access to resources of the mobile device by only the first virtual container.

In some embodiments, the process involves receiving the first device level command at the first agent and forwarding the first device level command to the controller.

In some embodiments, the process involves receiving the first virtual container level command at the controller and forwarding the first container level command to the first agent.

In some embodiments, the process involves converting, by the controller, the first device level command into a second container level command, and forwarding the second container level command to the first agent for execution, the second container level command to control access to resources of the mobile device by only the first virtual container.

In some embodiments, the first container level command controls access to resources of the mobile device by only the first virtual container by one or more acts selected from the group consisting of controlling access to one or more physical resources of the mobile device by only the first virtual container, controlling configuration of only the first container, controlling management of an application for only the first container, controlling provisions of certificates and credentials for only the first virtual container, and retrieving information about only the first virtual container.

In some embodiments, the process involves receiving a second device level command for retrieving information from the mobile device and receiving a second container level command for retrieving information from the first virtual container.

In some embodiments, the process involves managing, by the controller, the plurality of containers on the mobile device, managing being at least one of creating, removing, disabling, enabling, resuming, saving and restoring the plurality of containers on the mobile device.

In some embodiments, the plurality of containers has a second virtual container, and wherein the process further comprises receiving a second container level command and, executing, by the second agent, the second container level command to control access to the resources of the mobile device by the second virtual container.

In some embodiments, the process involves receiving the first container level command from a first server, and receiving the first device level command from a second server.

In some embodiments, the first server and the second server are associated with different organizations. This enables different organizations to implement MDM policies with container level commands and device level commands on the mobile device.

In some embodiments, the process involves determining an execution status of the first container level command and the first device level command and transmitting a feedback response indicating the execution status.

In some embodiments, the plurality of containers comprises a personal container and the process further involves disabling or enabling, by the controller, the personal container.

In some embodiments, the process involves determining a status of the personal container, transmitting the status, and receiving a command for disabling or enabling the personal container based on the status.

In some embodiments, the process involves transmitting a device identifier for the mobile device and a container identifier for the first virtual container, the device identifier and the container identifier for receiving the first device level command and the first container level command.

In accordance with another aspect, there is provided a process for mobile device management. The process involves transmitting, by a server, an activation message to a mobile device having a plurality of containers, each container of the plurality of containers isolating data and processes on the mobile device from other containers of the plurality of containers, the activation message activating a first virtual container of the plurality of virtual containers. The process involves transmitting, by the server, a first container level command for execution by a first agent residing in the first virtual container to control access to resources of the mobile device by only the first virtual container. The process involves transmitting, by the server, a first device level command for execution by a controller residing on the mobile device to control access to resources of the mobile device by all of the plurality of containers.

In some embodiments, the process involves receiving, at the server, a feedback response indicating an execution status of the first container level command and the first device level command, and transmitting, by the server, a second container level command and a second device level command based on the feedback response.

In some embodiments, the process involves transmitting the first container level command using a unique identifier comprising a container identifier for the first virtual container and a device identifier for the mobile device.

In some embodiments, the process involves receiving the container identifier and the device identifier from the mobile device.

In some embodiments, the process involves assigning the container identifier to the first virtual container and the device identifier to the mobile device.

In some embodiments, the process involves establishing, using the container identifier and the device identifier, a secure connection to the first virtual container for transmitting the first container level command.

In some embodiments, the process involves establishing, using the container identifier and the device identifier, a secure connection to the first agent residing in the first virtual container for transmitting the first container level command.

In some embodiments, the process involves establishing, using the device identifier, a secure connection to the mobile device for transmitting the first device level command.

In some embodiments, the process involves registering a user account, authenticating the mobile device and the first virtual container, and linking the mobile device and the first virtual container to the user account.

In accordance with another aspect, there is provided a mobile device having a plurality of containers, each container of the plurality of containers isolating data and processes on the mobile device from other containers of the plurality of containers, the plurality of containers having a first virtual container. The mobile device has a physical communication interface to receive a first device level command and a first container level command. The mobile device has at least one processor to configure a first agent residing in the first virtual container to execute the first container level command to control access to resources of the mobile device by only the first virtual container; and a controller residing on the mobile device, the controller for executing the first device level command to control access to the resources of the mobile device by all of the plurality of containers.

In some embodiments, the controller resides in a host container of the plurality of containers of the mobile device.

In some embodiments, the controller does not reside in any one of the plurality of containers.

In accordance with another aspect, there is provided a system for mobile device management. The system has a first agent residing in a first virtual container of a plurality of containers on a mobile device, each container of the plurality of containers isolating data and processes from other containers of the plurality of containers. The system has a controller residing on the mobile device. The system has at least one server in secure communication with the mobile device to transmit commands including a first device level command and a first container level command, the first device level command for execution by the controller to control access to the resources of the mobile device by all of the plurality of containers, the first container level command to control access to resources of the mobile device by only the first virtual container.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures, wherein in the figures:

FIGS. 16A and 16B are diagrams of control flows for a mobile device according to some embodiments.

DETAILED DESCRIPTION

Figure 1:
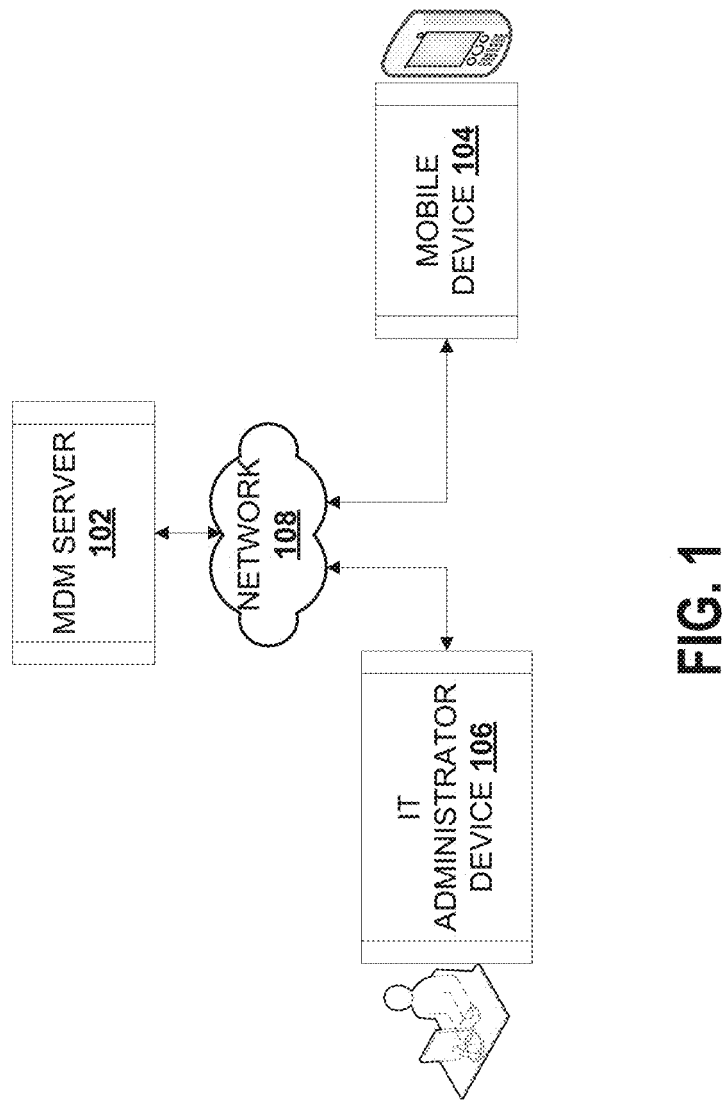
FIG. 1 is a schematic diagram of an example MDM system according to some embodiments.

FIG. 1 is a schematic diagram of an example MDM system according to some embodiments. The MDM system supports multiple containers on a mobile device 104. Multiple containers refer to multiple separate and independent virtual environments on a single mobile device 104. For example, one environment can be for personal use and another environment can be for work use. A container isolates a portion of the mobile device 104 from another portion of the mobile device 104 for another container. This isolation may be desirable for privacy and security, for example.

MDM server 102 issues commands to mobile device 104 in order to implement an MDM policy. In particular, the MDM server 102 issues container level commands to an MDM agent residing in a container on the mobile device 104. The container can be a work container, for example.

An IT administrator device 106 couples to the MDM server 102 to configure the MDM policy. The MDM policy may apply to the mobile device 104 or one or more of the multiple containers. That is, an IT administrator device 106 can configure scoped MDM controls at both the device level and container level. The MDM server 102 can connect to multiple mobile devices 104. The MDM server 102 can couple to each of the multiple mobile devices 104 to implement MDM policies. The MDM server 102 can implement the same MDM policy for all mobile devices 104. In other embodiments, the MDM server 102 can implement different MDM policies for mobile devices 104.

Network 108 (or multiple networks) directly or indirectly connects components of system in various ways. Network 108 is capable of carrying data so that the so that various components of system can exchange data. Network 108 can involve wired connections, wireless connections, or a combination thereof. Network 108 may involve different network communication technologies. Examples include Global System for Mobile Communications (GSM), Code division multiple access (CDMA), wireless local loop, WMAX, Bluetooth, Long Term Evolution (LTE), and so on.

Embodiments provide systems and methods to support MDM mechanisms for one or more managed containers or virtual mobile devices for mobile device 104. The systems and methods support heterogeneous operating systems running on the kernel of the mobile device 104. The systems and methods add additional security strength by providing a loosely coupled MDM containerization architecture. This allows an IT administrator device 106 to have scoped MDM controls both at the device level and at the container level, which may be in accordance with the decisions of an IT administrator (not shown).

Embodiments described herein provide strong security and control by balancing enterprise security control and personal privacy on mobile device 104. Multiple containers exist on the same managed mobile device 104, including both work containers and personal containers. Work containers may be of the same work related organization or a different organization.

Embodiments described herein provide an MDM containerization framework that provides encapsulation and separation of loosely coupled MDM components. The containerization MDM framework provides an innovated architecture to support existing MDM products running within containers on the mobile device 104. The container framework provides MDM capabilities. Embodiments provide application programming interfaces (APIs) for managing containers. This may enable reuse of legacy OS MDM APIs and integration with existing IT infrastructure Embodiments described herein provide an MDM Containerization framework with enhanced security and privacy and an MDM policy to enhance productivity for employees.

Embodiments described herein provide a consistent user experience of the same level of consistency and productivity no matter the user is using a personal container or a work container on the mobile device 104.

Embodiments described herein provide built-in MDM capabilities using the container architecture to support scoped MDM policies both at the device level and container level. It should be understood that a policy or command having device-level scope may include a policy or command that applies to more than one, but less than all, of the containers of a particular device, i.e., a policy or command that applies to more than one container.

Figure 2:
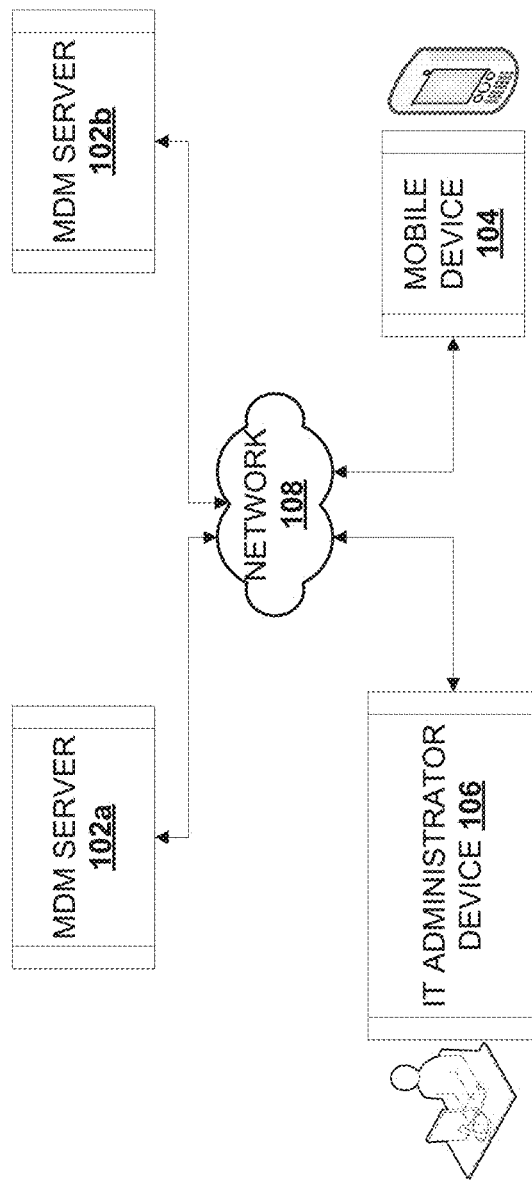
FIG. 2 is a schematic diagram of another example MDM system according to some embodiments.

FIG. 2 is a schematic diagram of another example MDM system according to some embodiments. As shown there may be multiple MDM servers 102 to implement multiple distinct MDM policies for a given mobile device 104. For example, one MDM server 102a couples to mobile device 104 to implement a first MDM policy for a first container, and another MDM server 102b couples to mobile device 104 to implement a second MDM policy for a second container. Although only one mobile device 104 is shown there may be multiple mobile devices 104. Each MDM server 102a, 102b (also referred to generally as MDM server 102) can couple to multiple mobile devices 104 to implement an MDM policy.

Figure 3A:
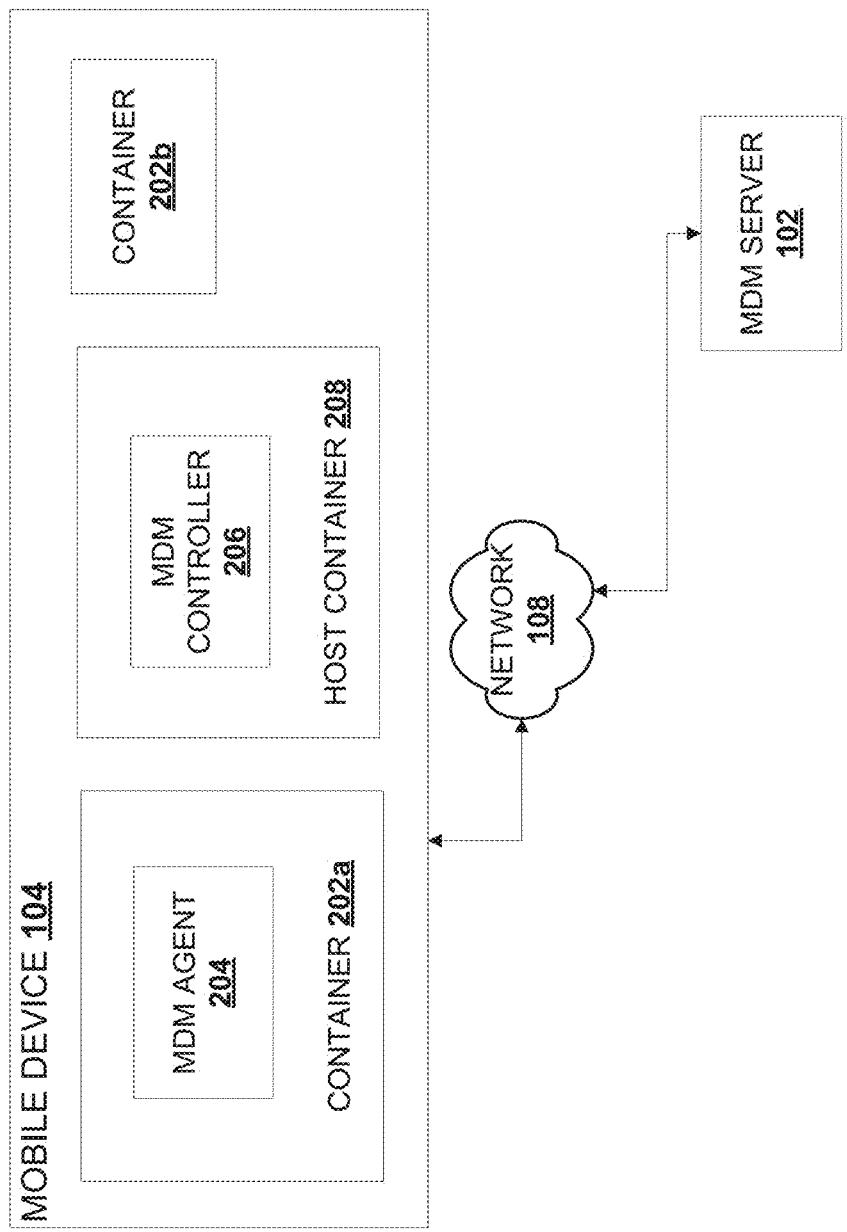
FIG. 3A is a schematic diagram of a first example mobile device according to some embodiments.

FIG. 3A is a schematic diagram of an example mobile device 104 according to some embodiments. Mobile device 104 has an MDM agent 204 that manages a container 202a. The MDM agent 204 implements MDM policies by executing container level commands received from MDM server 102. In some embodiments, the container 202a is a work container and the MDM server 102 implements an MDM policy for work related use of the mobile device 104. Mobile device 104 has another container 202b that can be a personal container to manage personal use of the mobile device. Integration with MDM policies enables additional security and management capabilities at both the device level and the individual container level. Mobile device 104 has an MDM controller 206 within a host container 208. The MDM controller 206 receives device level commands from MDM server 102.

The containerization framework supports MDM policies applied device wide or only within a container 202a, 202c. For example, MDM agent 204 executes container level commands to manage the container 202a. The MDM controller 206 within host container 208 of mobile device 104 executes device level commands to control components of mobile device 104 for all containers 202a, 202b.

An example is a framework on the kernel to support separated mobile containers. Each container 202a, 202b can be treated as an independent virtual device. This may permit a user to make better use of hardware and software resources of the managed mobile device 104. The container framework supports heterogeneous operating systems to construct multiple containers 202a, 202b.

A container 202a, 202b can be integrated with an MDM solution that an organization has in place or is planning to introduce in order to manage the mobile devices 104. The mobile devices 104 may be owned by the organization and/or operated by users engaged with the organization. An organization may implement BYOD and COPE policies using MDM server 102.

Each container 202a, 202b isolates processes and data while sharing resources of the mobile device 104 in accordance with the organization IT or MDM policies. Each container 202a, 202b is separately configured and managed without awareness of any other containers. The MDM server 102 can interact with both MDM agent 204 and MDM controller 206 to provide a scoped policy with container level and device level commands.

MDM agent 204 is a computing application running inside container 202a. MDM controller 206 is a computing application running inside host container 208 on the mobile device 104. MDM policies can be applied inside a container 204a using commands generated and transmitted by the MDM server 102 to the MDM agent 204, within the container 202a. In some embodiments, the MDM server 102 only communicates with MDM agent 204. The MDM controller 206 manages device level commands. The MDM agent 204 in the container 202a or the MDM controller 206 in the host container 208 can determine the scope of the command (e.g. container level, device level). The container 202a can be a work container. The MDM server 102 issues commands to the MDM agent 204a to control operation of the work container 202a according to an enterprise IT policy. The mobile device 104 implements a scoped policy using MDM agent 204 and the MDM controller 206. Another container 202b may be referred to as a personal container. Personal container 202b can be enabled/disabled by the MDM controller 206. A personal container 202b does not have an MDM agent 204 installed therein. A personal container 202b can be controlled using device level commands that apply to all containers 202a, 202b. For example, MDM controller 206 within host container 208 executes device level commands to control device resources for all containers 202a, 202b.

In some embodiments, mobile device 104 receives a device level command and a container level command. The MDM agent 204 residing in the container 202a executes the container level command to control only container 202a. That is, the MDM agent 204a applies the policy within the container 202a without impact to other containers. For example, the container level command may stop operation of a camera on the mobile device 104 for one container 202a.

The MDM agent 204 and the MDM controller 206 can determine the scope of the commands and transmit the commands to the applicable container of the mobile device 104. In some embodiments, the MDM controller 206 residing on the host container 208 receives the container level command and forwards the container level command to the MDM agent 204 for execution. In other embodiments, the MDM agent 204a residing within the container 202a receives the device level command and forwards the device level command to the MDM controller 206.

The MDM controller 206 can determine the applicable container 202 for the container level command. For example, if the container level command is applicable to the container 202a, the MDM controller 206 can forward the container level command to the MDM agent 204a residing within the container 202a for execution. The MDM agent 204 and the MDM controller 206 can both route commands to provide flexibility to IT administrators.

As an illustrative example, the container level command controls the container 202a by controlling access to one or more device resources of the mobile device 104 by only the container 202a. As another example, the container level command controls the container 202a by controlling configuration of only the container 202a. Further examples include controlling management of an application for the container 202a, controlling provision of certificates and credentials for the container 202a, and retrieving information about the container 202a. As another example, the container level command retrieves information from the container 202a.

An MDM controller 206 residing within the host container 208 executes device level commands to control operation of the mobile device 104 for all containers 202 or for the applicable subset of containers 202. For example, the device level command may stop operation of a camera on the mobile device 104 for all containers 202 on mobile device 104.

In other embodiments, the MDM agent 204 residing within the container 202a receives the device level command and forwards the device level command to the MDM controller 206 in the host container 208 for execution. In some embodiments, the MDM controller 206 converts the device level command into a plurality of container level commands for each of the containers to which the device level command applies, which may in some examples be all of the containers. The MDM controller 206 then forwards each container level command to its target container. For example, the MDM controller 206 forwards one of the container level commands to the MDM agent 204a residing within the container 202a for execution.

In some embodiments, mobile device 104 receives additional container level commands. An MDM controller 206 residing within the host container 208 can execute the container level command to control access to the resources of the mobile device 104 by the container 202b.

In some embodiments, an MDM controller 206 activates a container 202b. The MDM controller 206 manages the container 202b on the mobile device 104 by removing, disabling, enabling, resuming, saving, or restoring the container 202b, for example.

In some embodiments, the MDM server 102 deploys the MDM agent 204 within the container 202a. The MDM controller 206 is a component or service built into the mobile device 104.

In some embodiments, an MDM agent 204a determines an execution status of the container level command or the device level command. The MDM agent 204a transmits a feedback response to the MDM server 102. The feedback response indicates the execution status for the commands.

In some embodiments, an MDM agent 204 determines a status of a container 202 and transmits the status to the MDM server 102. In response, the MDM agent 204 receives command for controlling the container 202 based on its status.

In some embodiments, an MDM agent 204a transmits, to the MDM server 102, a device identifier for the mobile device 104 and a container identifier for the container 202a. The container identifier can be for receiving the container level command.

In some embodiments, the MDM controller 206 residing within the host container 208 enables and disables a container 202b that is not managed by the MDM agent 204. In some embodiments, the containers 202a, 202b, 202c run heterogeneous operating systems.

Figure 3B:
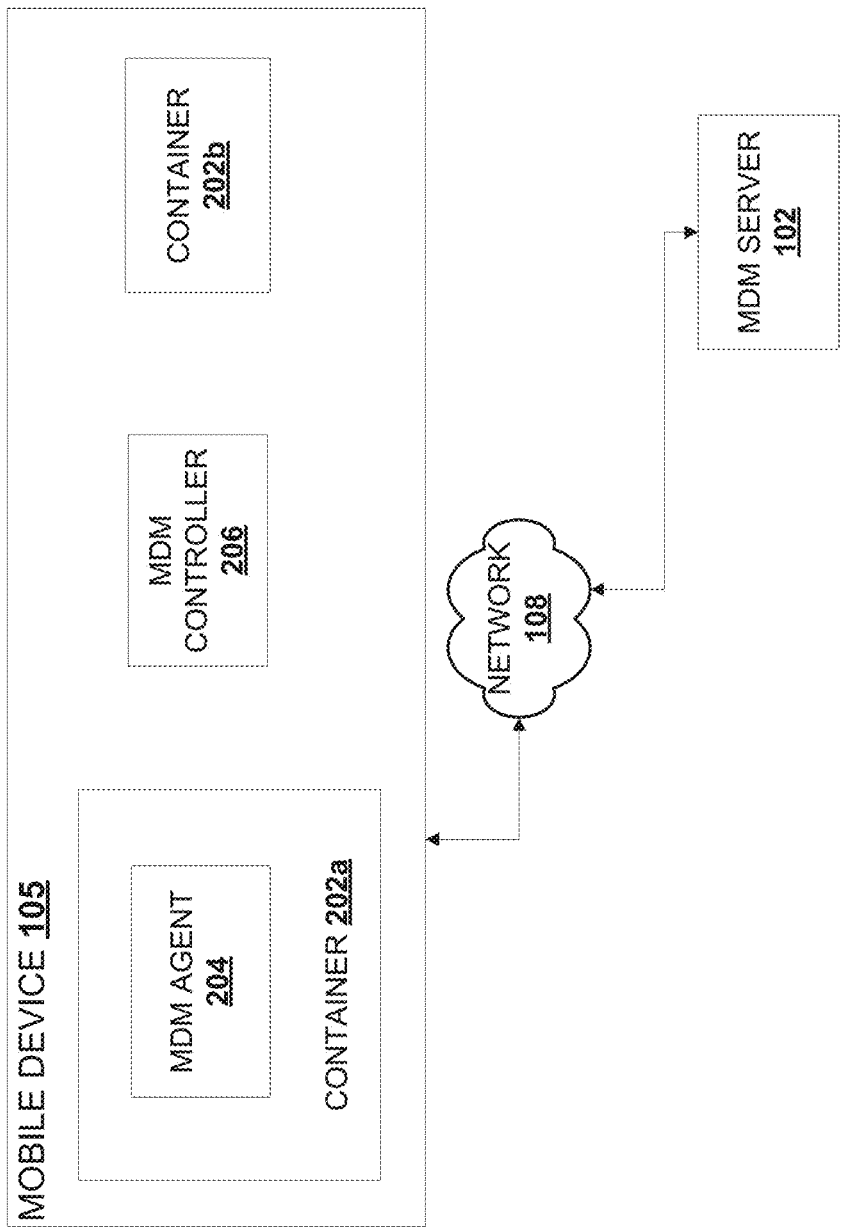
FIG. 3B is a schematic diagram of a second example mobile device according to some embodiments.

FIG. 3B is a schematic diagram of an example mobile device 105 according to an alternative embodiment. The mobile device 104 of FIG. 3B is similar to the mobile device 104 of FIG. 3A, with the exception that the MDM controller 206 in the mobile device 105 does not reside in a host container. The remaining features of FIG. 3B are similar to the corresponding features of FIG. 3A, and will not be described again in detail. All references to the mobile device 104 in the present disclosure should be understood to also refer to the mobile device 105.

Figure 4:
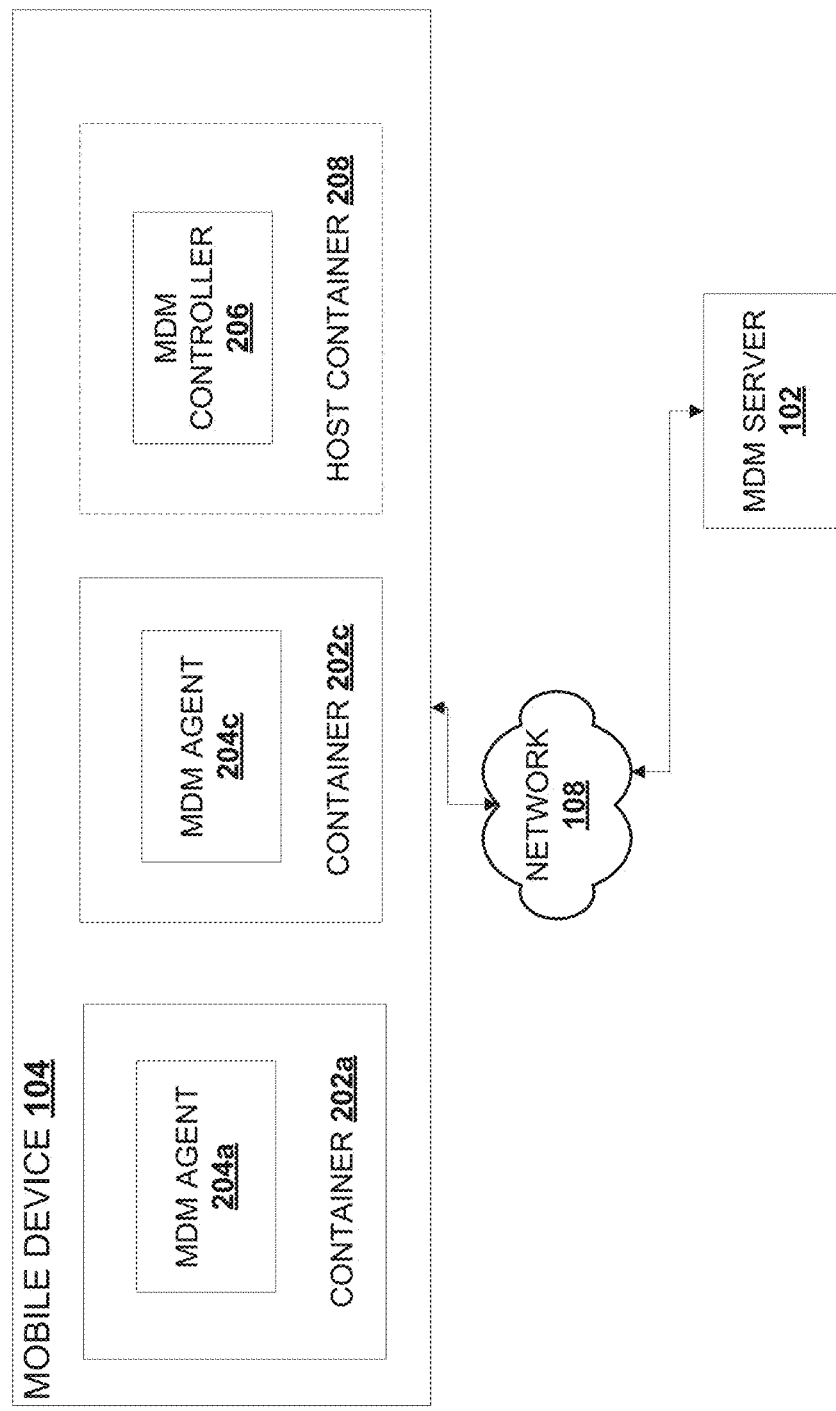
FIG. 4 is a schematic diagram of another example mobile device according to some embodiments.

FIG. 4 is a schematic diagram of another example mobile device 104 according to some embodiments. An MDM Agent 204a controls a container 202a on the mobile device 104. An MDM agent 204c controls a separate container 202c using container level commands. The MDM controller 206, optionally within the host container 208, executes device level commands that apply to both containers 202a, 202c. In some embodiments, the MDM agent 204c executes container level commands that apply to one container 202c. The container 202c may be a work container. The MDM server 102 issues commands to the MDM agent 204c to control operation of the container 202c according to an enterprise IT policy. The MDM server 102 can also issue the same or different commands to the MDM agent 204a to control operation of the other container 202a according to the enterprise IT policy.

In some embodiments, the MDM server 102 deploys the MDM agent 204a within the container 202a. The MDM server 102 deploys the other MDM agent 204c within the other container 202c. Although only two MDM agents 204a, 204c are shown in this example, there may be more agents 204a, 204c. The MDM controller 206 within the host container 208 is a built-in component or service on mobile device 104.

Figure 5:
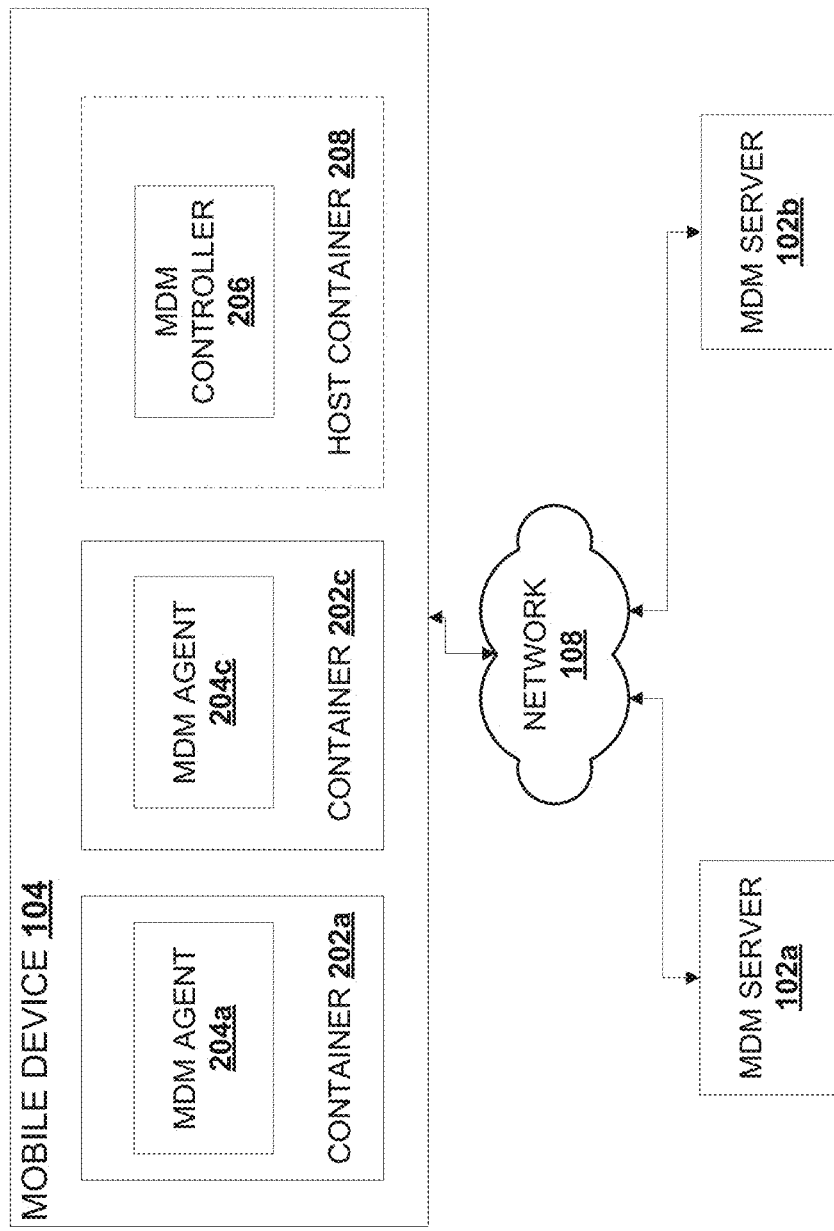
FIG. 5 is a schematic diagram of a further example mobile device according to some embodiments.

FIG. 5 is a schematic diagram of a further example mobile device 104 according to some embodiments. In this example embodiment, a first MDM server 102a issues commands to the MDM agent 204a to control operation of the container 202a according to an enterprise IT policy. A second MDM server 102b issues commands to the MDM agent 204c to control operation of another container 202c according to another enterprise IT policy. This enables mobile device 104 to comply with IT policies from different enterprises or organizations. Accordingly, MDM agents 204a, 204c can implement different policies for different organizations. Each container 202a, 202c isolates data and processes on the mobile device 104 from the other container 202c, 202a. The MDM controller 206, optionally within host container 208, executes device level commands to control operation of mobile device 104 for all containers 202c, 202a.

In some embodiments, the MDM server 102a deploys the MDM agent 204a within the container 202a. The MDM server 102b deploys the other MDM agent 204c within the other container 202c.

The MDM controller 206 within the host container 208 executes a device level command to control access to the device resources of the mobile device 104 by all containers 202.

Figure 6:
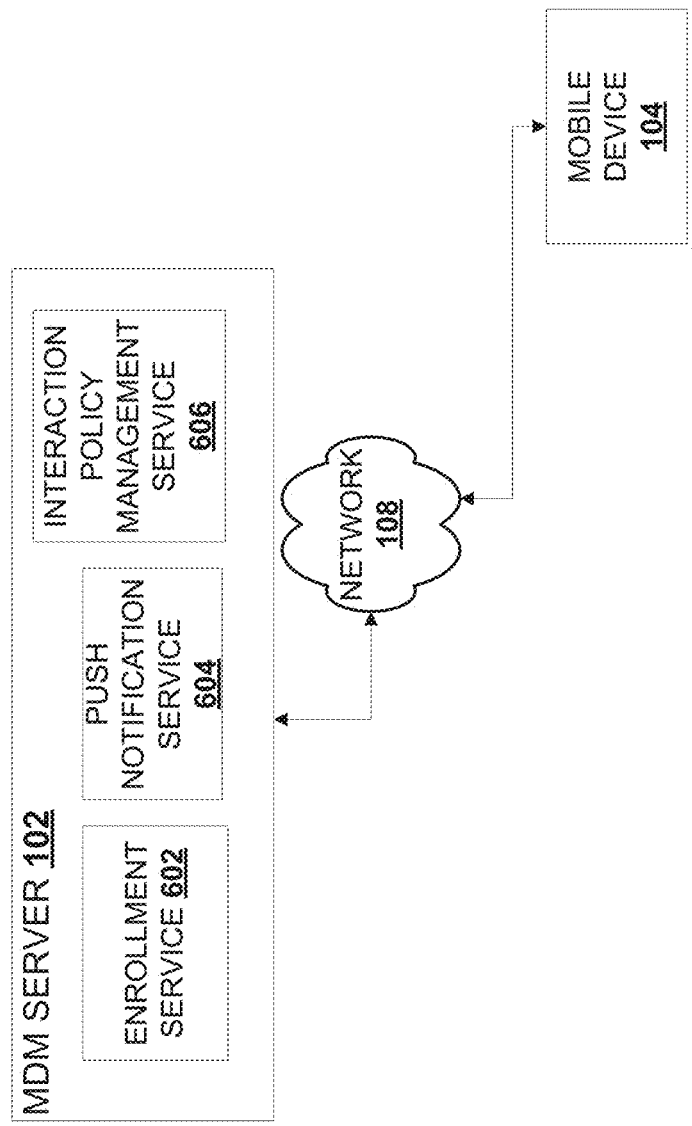
FIG. 6 is a schematic diagram of an example MDM server according to some embodiments.

FIG. 6 is a schematic diagram of an example MDM server 102 according to some embodiments. The MDM server 102 has an enrollment service 602, a push notification service 604 and an interaction policy management unit 606.

The enrollment service 602 activates one or more containers 202 within the mobile device 104 by transmitting an activation message to the mobile device 104. The enrollment service 602 generates and transmits the activation message using a device identifier corresponding to the mobile device 104. In some embodiments, the enrollment service 602 establishes a secure connection to a container 202 for transmitting the first container level command and the first device level command.

In some embodiments, the enrollment service 602 registers a user account for a user linked to the mobile device 104. The enrollment service 602 authenticates the mobile device 104 and one or more containers 202. The enrollment service 602 links the mobile device 104 and the one or more containers 202 to the user account.

The interaction policy management unit 606 stores and manages one or more scoped MDM policies. The MDM policies define device level commands and container level commands. One or more MDM policies may be applicable to the mobile device 104. One or more MDM policies may be applicable to the containers 202 residing on mobile device 104. The interaction policy management unit 606 generates and transmits device level commands and container level commands. The interaction policy management unit 606 uses device identifiers and container identifiers to generate the device level commands and container level commands. In some embodiments, the interaction policy management unit 606 receives and processes a unique identifier with a container identifier for a container 202 and a device identifier for the mobile device 104 to generate and transmit container level commands. The interaction policy management unit 606 receives the container identifier and the device identifier from mobile device 104 (including from one or more of the MDM agents 204a 204c residing thereon).

In some embodiments, the push notification service 604 establishes a secure connection to a container 202 for transmitting container level commands. In some embodiments, the push notification service 604 establishes a secure connection to MDM agents 204a, 204c for transmitting container level commands or device level commands. In some embodiments, the policy unit 604 establishes a secure connection to mobile device 104 for transmitting container level commands or device level commands.

The interaction policy management unit 606 receives notifications or messages indicating an execution status of device level commands and container level commands from mobile device 104.

Figure 7:
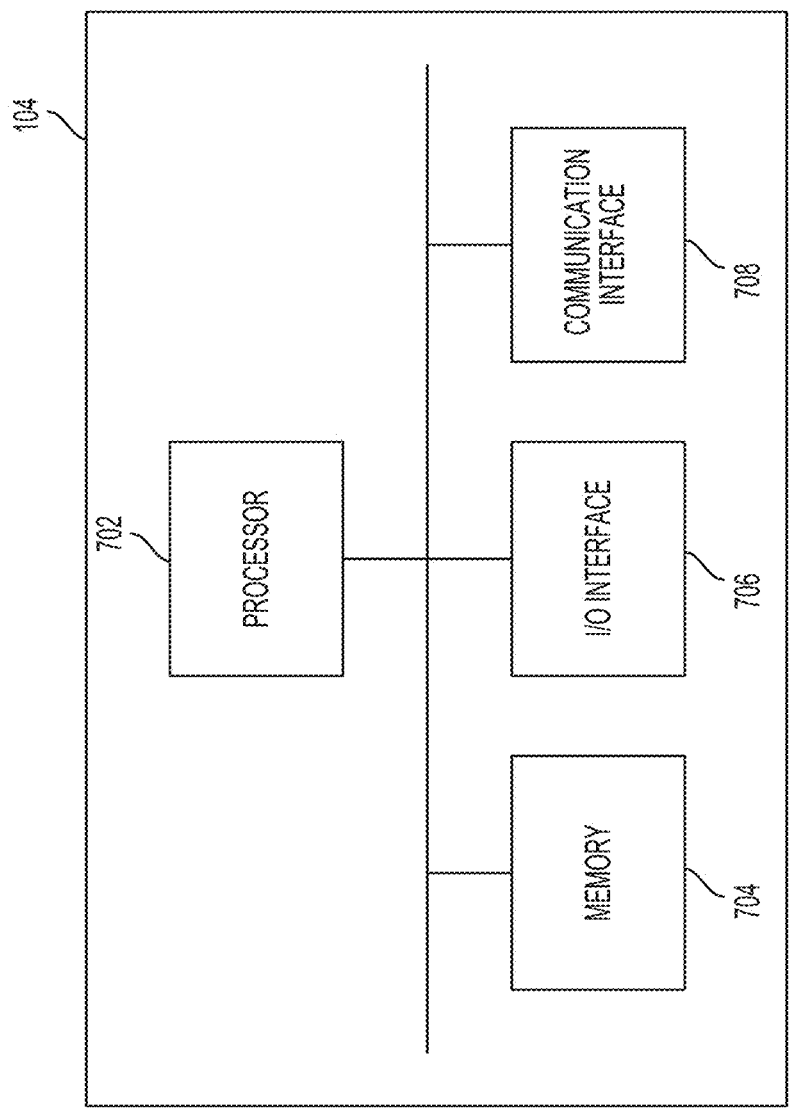
FIG. 7 is a schematic diagram of an example computing device for implementing aspects of mobile device or MDM server according to some embodiments.

FIG. 7 is a schematic diagram of an example mobile device 104 according to some embodiments. As depicted, the mobile device 104 includes at least one processor 702, at least one memory 704, at least one I/O interface 706, and at least one network interface 708.

Each processor 702 may be, for example, any type of general-purpose microprocessor or microcontroller, a digital signal processing (DSP) processor, an integrated circuit, a field programmable gate array (FPGA), a reconfigurable processor, or any combination thereof.

Memory 704 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 706 enables computing device to interconnect with one or more input devices, such as a keyboard, mouse, camera, touch screen and a microphone, or with one or more output devices such as a display screen and a speaker.

Each network interface 708 enables computing device to communicate with other components, to exchange data with other components, to access and connect to network resources, to serve applications, and perform other computing applications by connecting to a network (or multiple networks) capable of carrying data.

Mobile device 104 is operable to register and authenticate users (using a login, unique identifier, and password for example) prior to providing access to applications, a local network, network resources, other networks and network security devices. Mobile device 104 may serve one user or multiple users.

Figure 8:
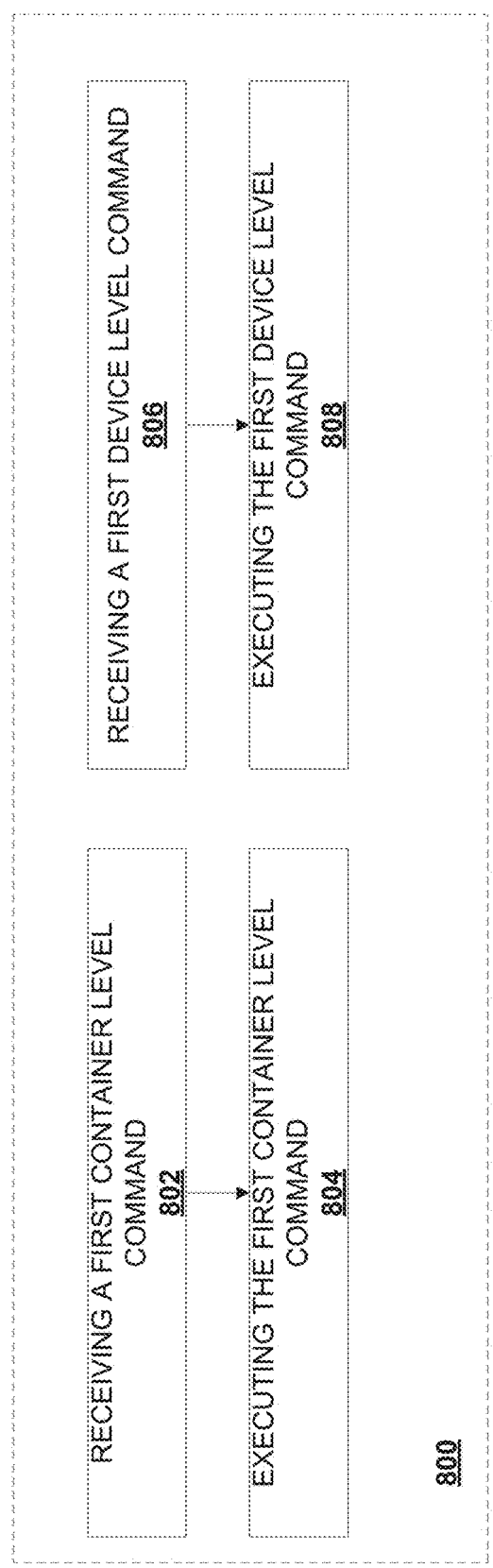
FIG. 8 is a diagram of an example process for a mobile device according to some embodiments.

FIG. 8 is a diagram of an example process 800 for a mobile device 104 according to some embodiments.

At 802, the mobile device 104 receives a container level command at an MDM agent 204 (FIG. 3A). The MDM server 102 implements a scoped policy by transmitting the container level commands to the MDM agent 204. The mobile device 104 has one or more containers. Each container isolates data and processes on the mobile device 104 from the other containers.

At 804, the MDM agent 204 (FIG. 3) executes the container level command to control access to hardware or software resources of the mobile device 104 for only the container 202a in which the MDM agent 204a resides. In other embodiments, an MDM controller that resides within a host container 208 or within the mobile device 104 executes a container level command to control a container 202b.

At 806, the mobile device 104 receives a device level command at the MDM agent 204 from the MDM server 102. At 808, the MDM controller 206 executes the device level command to control access to hardware or software resources on the mobile device 104 for all containers 202.

Further details relating to operation of the mobile device 104, MDM agents 204 and containers 202 are provided herein.

The process of FIG. 8 shows an example sequence of executing commands. However, there is no dependency between container level commands and device level commands and the sequence can vary. For example, the mobile device 104 can execute a device level command (at 808) before executing or receiving a container level command (at 804). As another example, the mobile device 104 can execute a first device level command (at 808) and a second device level command (returning back to 808) before executing a container level command (at 804). As a further example, the mobile device 104 can execute a first container level command (at 804) and a second container level command (returning back to 804) before executing a device level command (at 808).

Figure 9:
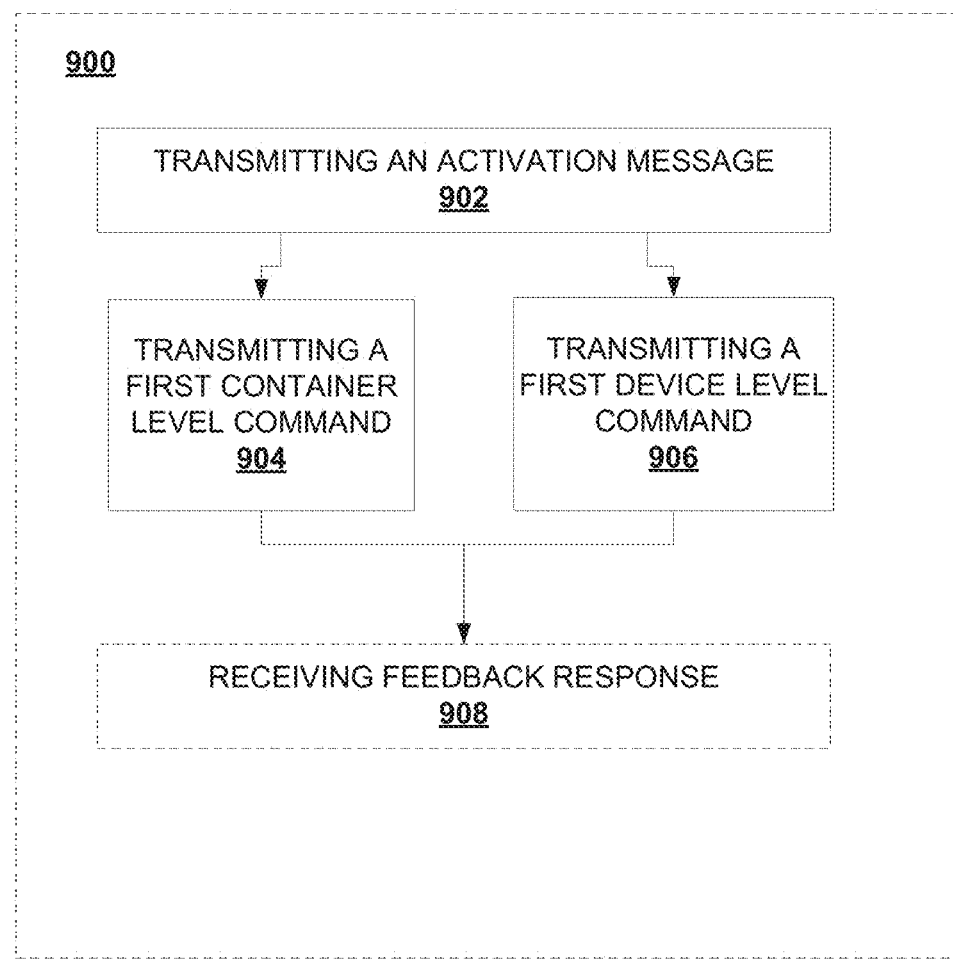
FIG. 9 is a diagram of an example process for an MDM server according to some embodiments.

FIG. 9 is a diagram of an example process for an MDM server 102 according to some embodiments.

At 902, the MDM server 102 can optionally transmit an activation message to the mobile device 104 to activate a container 202 on the mobile device 104, or to activate one or more MDM agents 204a, 204c within the containers 202a, 202c, or a combination thereof. This may be performed in response to the MDM server 102 receiving an activation request.

At 904, the MDM server 102 transmits a container level command for a container 202a (FIG. 3) of the mobile device 104. At 906, the MDM server 102 transmits a device level command to the mobile device 104. It should be understood that the MDM server may transmit more than one container level command or more than one device level command, and that these commands could be transmitted in any order.

At 908, the MDM server 102 receives a notification or message with a feedback response from the mobile device 104. The feedback response indicates an execution status of the container level command or the device level command.

Figure 10:
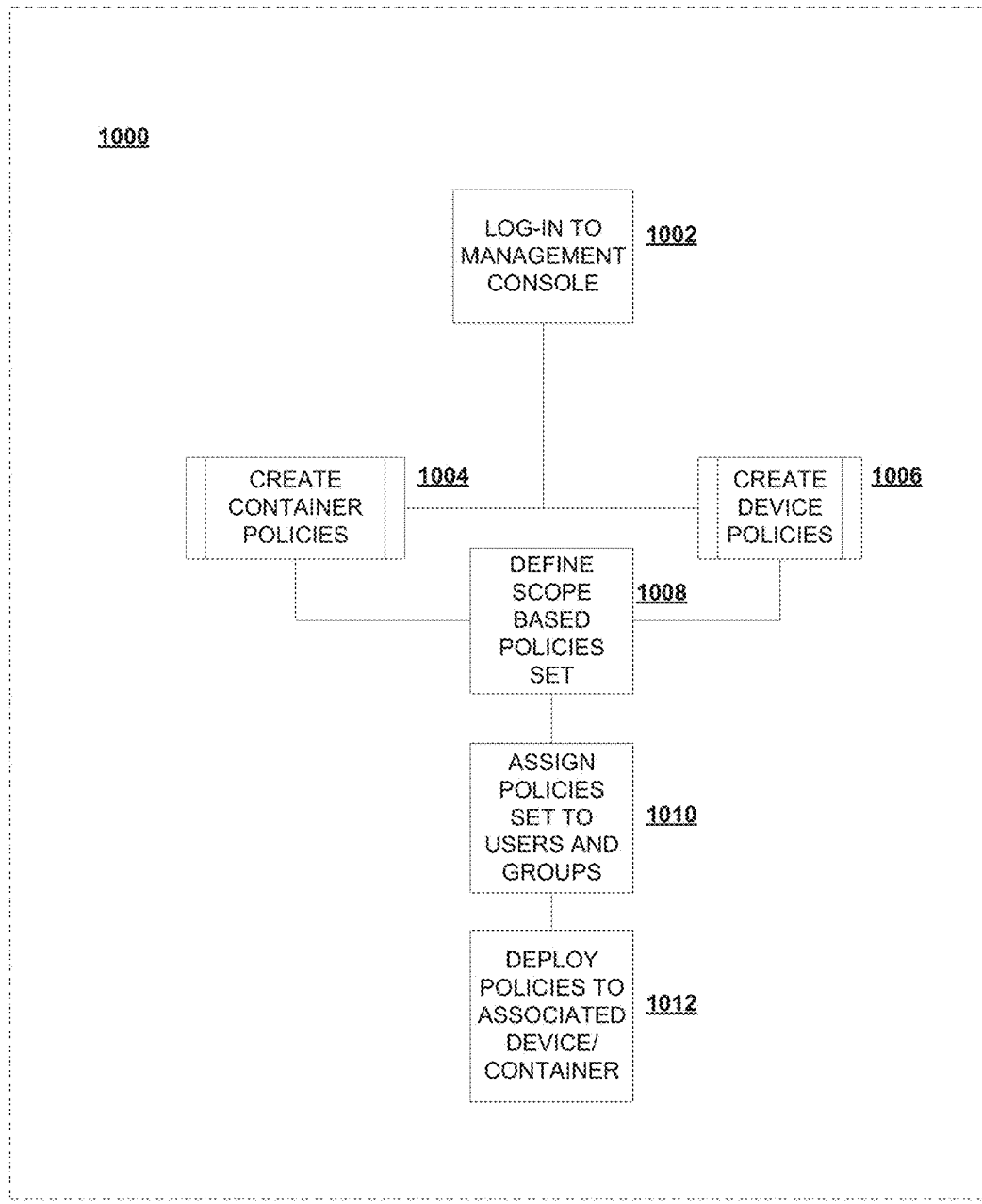
FIG. 10 is a diagram of an example process for MDM policies according to some embodiments.

FIG. 10 is a diagram of an example process 1000 for creating MDM policies according to some embodiments.

At 1002, an IT administrator device 106 logs into MDM server 102 by providing authentication information. The MDM server 102 verifies the authentication information before granting permission to create or update MDM policies.

At 1004, the IT administrator device 106 creates or updates container-level MDM policies. Mobile devices 104 or containers 202 are associated with specific users or user groups to which MDM policies may be assigned. The container level policies include one or more container level commands, each of which controls access to hardware or software resources of a mobile device 104 by an individual container 202 on the mobile device 104.

At 1006, the IT administrator device 106 creates or updates device policies. The device policies include one or more device level commands, each of which controls device-wide features and impact access to device resources for all containers 202 on the mobile device 104.

At 1008, the MDM server 102 defines a scoped policy set using the container policies and the device policies. A policy set is a common set of rules that are applied to a collection of users or managed mobile devices 104. The MDM server 102 generates and transmits commands based on the scope based policy set. The MDM policies are applied across mobile devices 104 that have been enrolled in MDM server 102.

The IT administrator device 106 has scoped control of managed mobile devices 104 using scope based policies. A scoped policy has commands of different scope (e.g. container level, device level).

A command or policy can have a scope attribute defining its scope (e.g. container level, device level). If a command or policy does not have a scope attribute, the default scope can either be a container level scope or device level scope, based on one or more pre-defined scope rules.

At 1010, the IT administrator device 106 assigns one or more scoped policy sets to users and groups of users. The users and groups can be associated with one or more mobile devices 104. The policies can be associated with one or more containers 202a, 202b, 202c on the mobile devices 104. Accordingly, scoped policy sets can be associated with a mobile device 104 or one or more containers 202a, 202b, 202c.

At 1016, the MDM server 102 deploys the scoped policy sets to mobile devices 104 or containers 202a, 202b, 202c based on the associated users and groups of users. In some embodiments, MDM agent 204 (FIG. 3) is pre-installed within container 202a of mobile device 104. In other embodiments, the MDM server 102 can deploy one or more MDM agents 204a, 204c to containers 202a, 202b, 202c. The MDM server 102 can trigger activation of mobile devices 104 and containers 202a, 202b, 202c. The MDM server 102 can establish a secure connection to mobile device 104, one or more MDM agents 204a, 204c and one or more containers 202a, 202b, 202c.

Figures 11A, 11B:
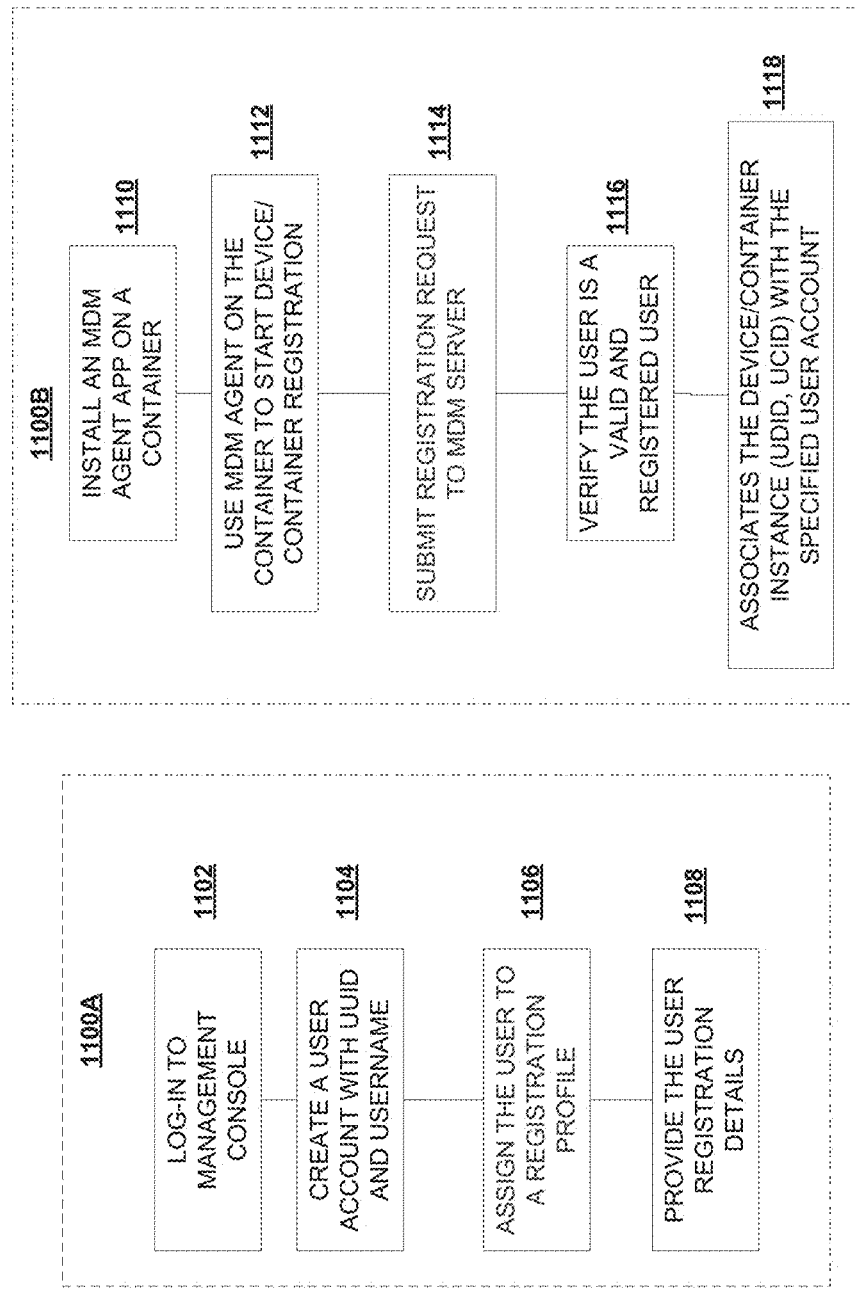
FIGS. 11A and 11B are diagrams of example processes for registration of a mobile device according to some embodiments.

FIGS. 11A and 11B are diagrams of example processes 1100a, 1100b for registration of a mobile device 104 or container 202a, 202b, 202c according to some embodiments. For example, if there are two containers 202a, 202c (FIG. 4) on mobile device 104 then each container 202a, 202c can be registered separately.

At 1102, an IT administrator device 106 logs into MDM server 102 by providing authentication information. The MDM server 102 verifies the authentication information before granting permission to register an instance of a mobile device 104 and a container 202a, 202b, 202c. The IT administrator device logs into an MDM console, which is an interface provided by MDM server 102 and displayed on the IT administrator device 106.

At 1104, the IT administrator device 106 adds or registers a user associated with the mobile device 104 using an MDM console to create an account for user. The IT administrator device 106 can use account information retrieved from an organization directory (e.g. Lightweight Directory Access Protocol) to create the account for the user or the mobile device 104. The MDM server 102 creates an account for the user and stores an account record, for example in an MDM database. The account record includes a user identifier and a user name. The account record can also include other fields such as organization, group, and so on. A user account can be used to create a link between a user and a mobile device 104. A user account can be used to create a link between a user and MDM policies. A user account can be used to create a link between a user and groups of users.

At 1106, the MDM server 102 assigns a registration profile to the user or mobile device 104 associated with the user. At 1108, the MDM server 102 provides the user or mobile device 104 associated with the user with registration details.

At 1110, the mobile device 104 installs an MDM agent 204 within a container 202*a* (FIG. 3). In some embodiments, the MDM agent 204 is pre-installed as part of the device image.

At 1112, the mobile device 104 runs an MDM registration application to start the activation process. The MDM registration application can be part of the MDM agent 204 or a separate application. The MDM registration application can be installed on the mobile device 104 or within a container 202*a*. The MDM registration application starts the activation of the mobile device 104 or container 202*a*, 202*c*. At 1114, the MDM registration application submits a registration request to MDM server 102.

At 1116, the MDM server 102 authenticates the mobile device 104, establishes a secure connection with the mobile device 104, and then validates a registration request from the mobile device 104. The MDM server 102 verifies that the user is a valid registered user in the MDM database. At 1118, the MDM server 102 associates the device/container instance with the specified user account in the MDM database. The MDM server 102 sends a successful activation message to the mobile device 104.

Once the mobile device 104 is activated, the MDM server 102 collects device/container information including a unique device ID (UDID) and a unique container ID (UCID) through the MDM agent for further scope-based MDM policy management. The MDM server 102 stores the UDID and UCID in the MDM database.

Figure 12:
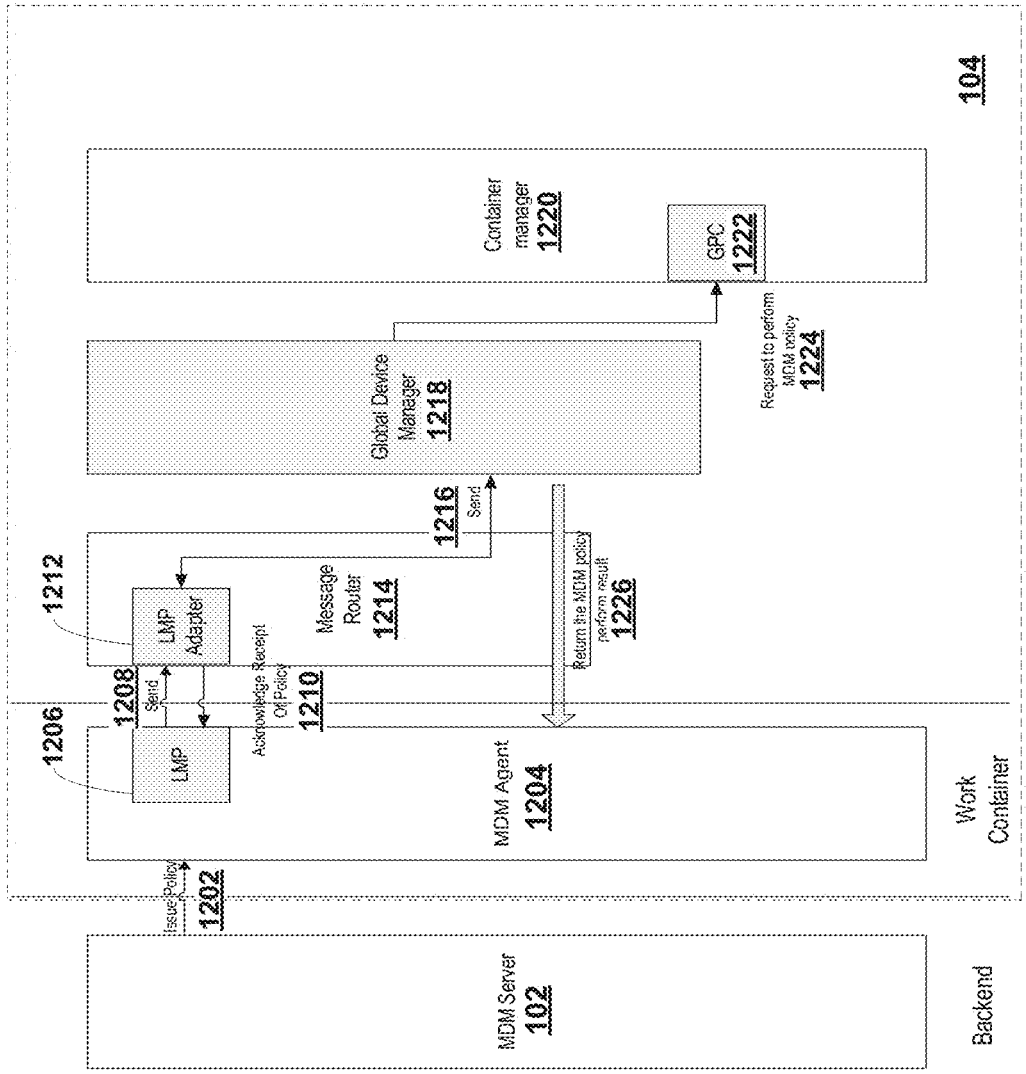
FIG. 12 is a diagram of an example process for applying an MDM policy according to some embodiments.

FIG. 12 is a diagram of an example process of applying an MDM policy according to some embodiments. The diagram shows interactions between different components of an MDM system. The MDM server 102 issues policies 1202 to MDM agent application 1204. The MDM agent application 1204 resides on mobile device 104, such as within a container 202*a*, 202*c* of mobile device 104.

The MDM agent application 1204 supports MDM containerization using a Local MDM Parser (LMP) 1206. The LMP 1206 receives and validates the commands of the MDM policies. The commands may be referred to as MDM messages. The LMP 1206 determines the scope of the MDM message (e.g. container-level, device level). The LMP 1206 executes commands of the MDM policies set locally. In some embodiments, the LMP 1206 forwards device level commands to the host container 208 at 1208. The MDM controller 206 within host container 208 executes device level commands.

The Local MDM Parser Adapter (LMPA) 1212 is a component of host container 208 for routing the device level commands from the LMP 1206 to the Global Device Manager (GDM) 1218. The LMPA 1212 acknowledges receipt of the commands at 1210. The LMPA 1212 sends the commands using a message router 1214 (at 1216).

The GDM 1218 maintains a device level MDM policy list. The GDM 1218 checks updates to the MDM policy lists. The GDM 1218 requests the Container Manager 1220 to apply device level commands at 1224. The Global Policy Controller (GPC) 1222 is a component of the container manager 1220 dedicated to respond to MDM requests from GDM 1218 to apply the device level commands.

The mobile device 104 applies the MDM policy received from the MDM server 102.

The MDM agent 1204 forwards the device level commands to GDM 1218 (via LMP 1206 and Message router 1214). The GDM 1218 applies device-wide MDM policies. At 1226, the GDM 1218 sends a response back to MDM agent 1204 with status messages, such as MDM policies processing and applying results, for example.

Figure 13:
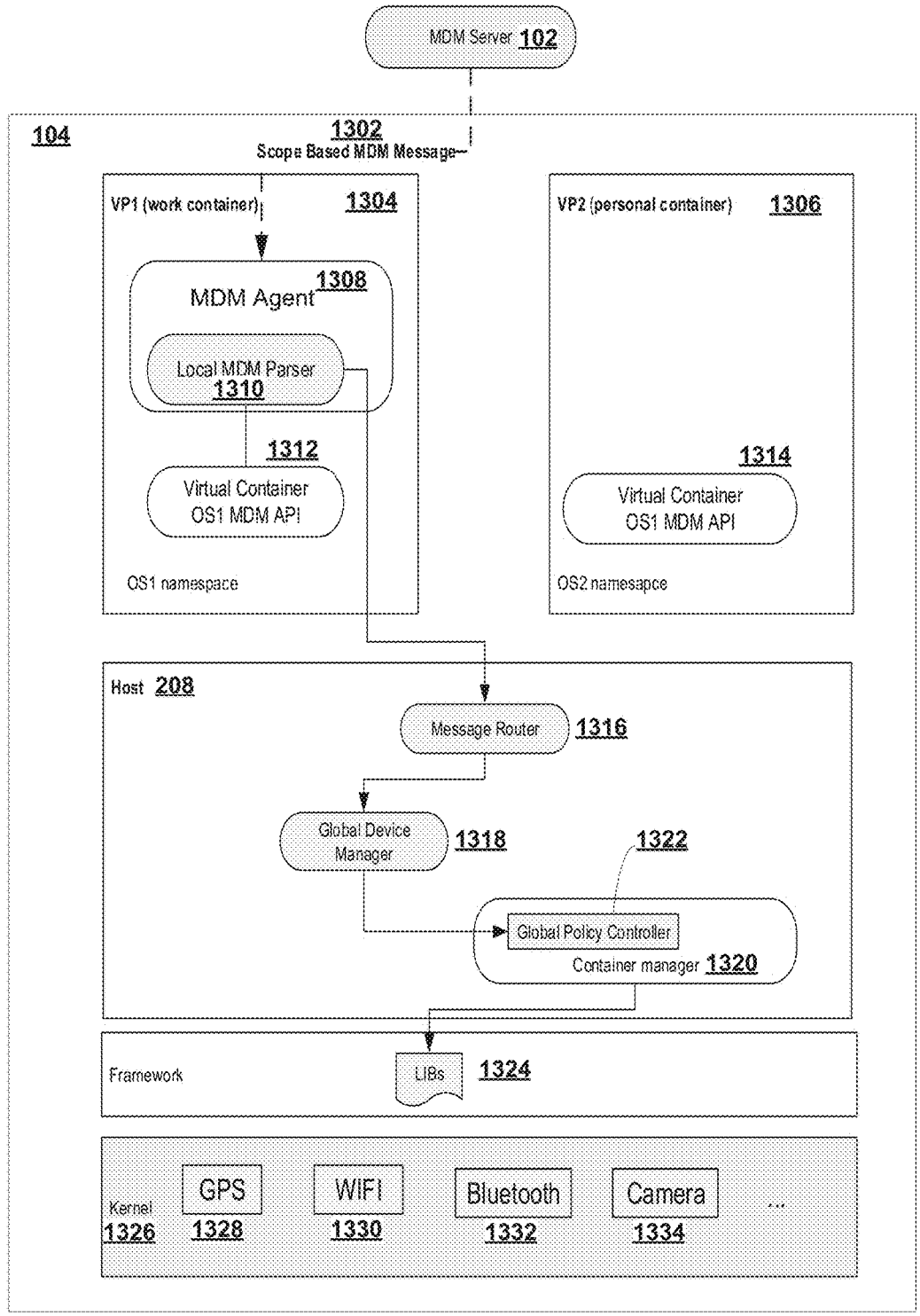
FIG. 13 is a schematic diagram of example components of a mobile device and MDM server according to some embodiments.

FIG. 13 is a schematic diagram of an example MDM system according to some embodiments. The MDM server 102 issues scope based MDM messages or commands 1302 to mobile device 104.

The example shown has a work container 1304 and a personal container 1306. The MDM agent 1308 is inside the work container 1304. There is no MDM agent inside the personal container 1306 in this example. The MDM server 102 (e.g. operated by an IT administrator) controls work container 1304, and all applications, data and activities are under MDM control by the organization. In some embodiments, the IT administrator device 106 gets control over the work container 1304. An end user gets control over the personal container 1306 (VP2), and all applications, data, and activities remain invisible to MDM server 102. MDM policies and commands are applied within predefined scope based on the container level and device level commands with the scope attribute sent from MDM server 102. The mobile device 104 executes access control rules for enhanced security. A virtual container MDM API 1312 configures the work container 1304, and a virtual container MDM API 1314 configures the personal container 1306. A LMP 1310 forwards device level commands to GDM 1318 using message router 1316. The GPC 1322 of the container manager 1220 responds to the MDM requests from GDM 1218 to execute the device level commands. The GPC 1322 can be within the host container 208. The device level commands control operation of the mobile device 104 using libraries, the kernel 1326 and device resources such as a global positioning system (GPS) components 1328, WiFi components 1330, Bluetooth components 1332, and a camera 1334.

The mobile device 104 can disable or enable a personal container 1306. For example, the mobile device 104 can execute a command from an MDM policy to disable and enable all personal containers 1306. The MDM server 102 (operated by an IT administrator) can send a command to mobile device 104 based on the MDM policy to enable and disable all personal containers 1306 on certain conditions (e.g. location of mobile device 104 relative to a virtual boundary). An MDM agent 1308 forwards the command via LMP 1310 and Message Router 1316 to GDM 1318. The GDM 1318 interprets the command and then sends the request to disable or enable the personal container 1306 to the GPC 1322 in the CM 1320. The CM 1320 executes the enable and disable action on the personal container 1306 and sends responses back to the MDM agent 1308 indicating that the enable and disable action executed. The MDM server 102 gets the update of personal container status from the MDM agent 1308.

Figure 14:
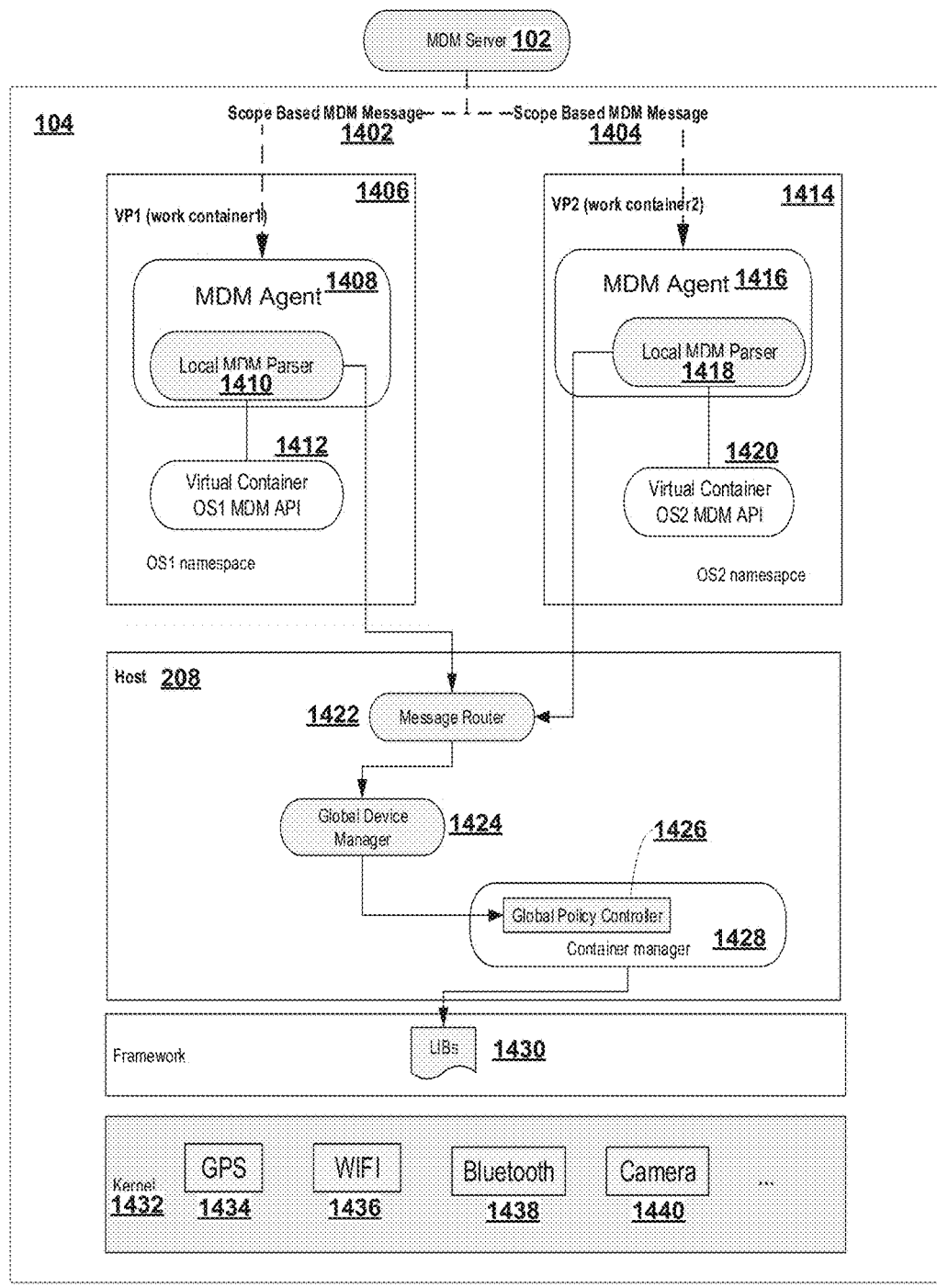
FIG. 14 is a schematic diagram of components of another example mobile device and MDM server according to some embodiments.

FIG. 14 is a schematic diagram of another example MDM system according to some embodiments.

The example shown includes work containers 1406, 1414 on heterogeneous operating systems under control of one MDM server 102. The different types of operating systems interact with the work containers 1406, 1414 using virtual container MDM APIs 1412, 1420. An MDM agent 1408, 1416 is inside each work container 1406, 1414. The LPMs 1410, 1418 route messages to GDM 1424 using the message router 1422. The GPC 1426 of the container manager 1428 executes commands to control access to device resources such as the kernel 1432, GPS components 1434, WiFi components 1436, Bluetooth components 1438, and a camera 1440.

The MDM server 102 has control over the work containers 1406, 1414 and all applications, data and activities are under MDM control by the enterprise. The work containers 1406, 1414 can be managed by the same enterprise. The MDM policies and commands are applied within predefined scope based on the MDM policies/commands with the scope attribute sent from MDM server 102.

Figure 15:
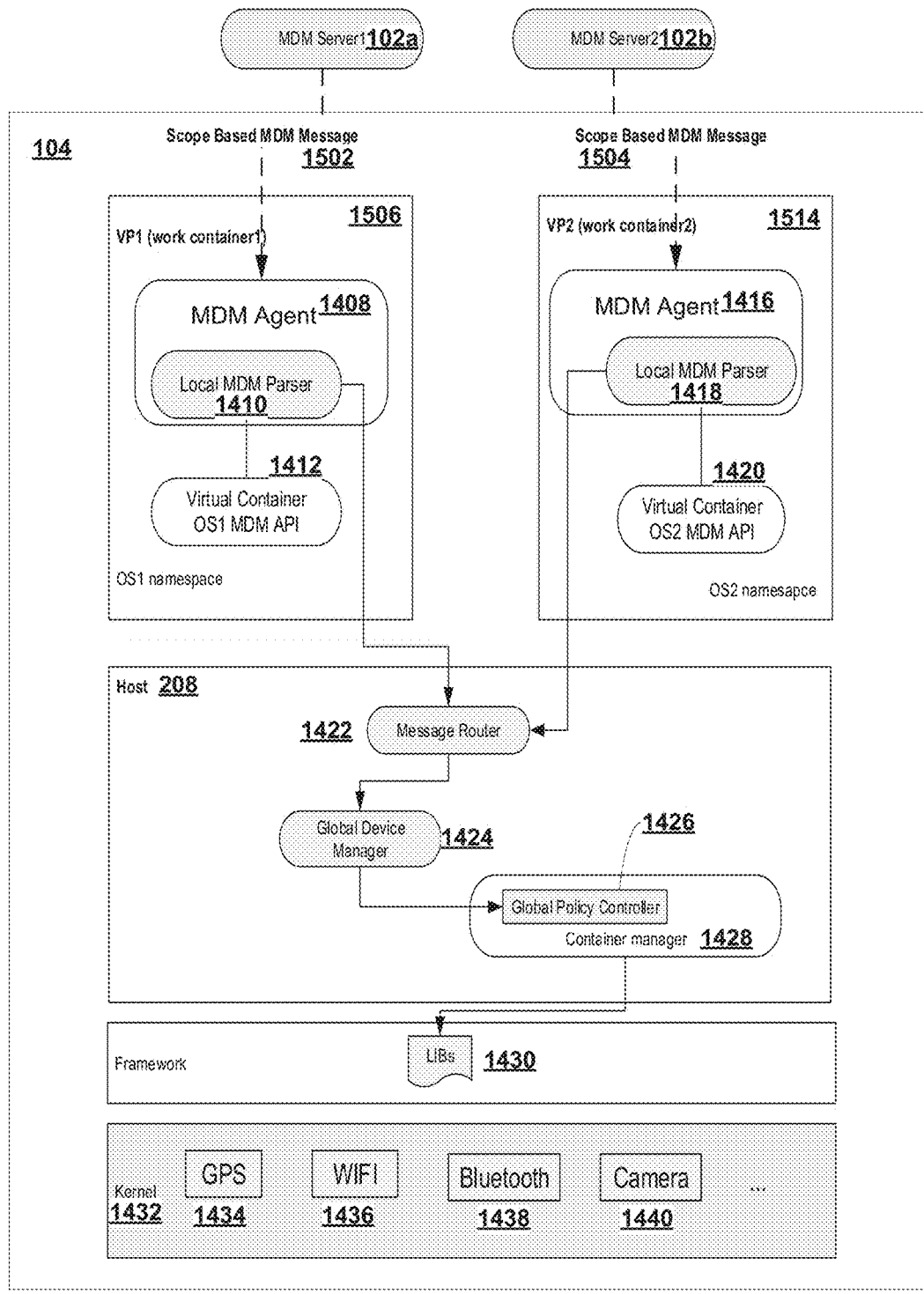
FIG. 15 is a schematic diagram of further example components of a mobile device and MDM server according to some embodiments.

FIG. 15 is a schematic diagram of a further example MDM system according to some embodiments. The example shown includes work containers 1506, 1514 on heterogeneous operating systems under control of different MDM servers 102a, 102b.

Each work container 1506, 1514 is managed by a different MDM server 102a, 102b. Each MDM servers 102a, 102b can be associated with a different enterprise. Each work container 1506, 1514 is totally separated from any other container 1506, 1514. The work containers 1506, 1514 are managed by the different enterprises using scoped commands or MDM messages 1502, 1504.

FIGS. 16A and 16B are diagrams of control flows for a mobile device 104 according to some embodiments. The mobile device has a work container 1602 and a host container 208. The mobile device 104 and MDM server 102 exchange feedback data. The feedback includes execution status messages relating to the status of command execution. The command execution indicates whether the commands executed successfully or not.

There is a downstream control flow 1600a portion and an upstream control flow 1600b portion. A work container 1602 receives a command at an MDM agent 1604 and forwards device level commands to GDM 1616 using LMP 1606 message router 1612 for the downstream 1600a portion. The work container 1602 and the host container 208 are connected using server sockets 1608, 1610. The message router 1612 and the GDM 1616 are connected using a client socket 1614. The GDM 1616 forwards execution status messages or container level commands to MDM agent 1604 for the upstream control flow 1600b portion.

Embodiments described herein enable and disable personal containers, such as for example container 202b of FIG. 3. A personal container is a non-work container and does not have an MDM agent installed therein. There might be one or more personal containers in a containerized mobile device 104.

Embodiments described herein provide a loosely coupled, API driven MDM architecture to support heterogeneous operating systems for cross-platform compatibility and portability. The MDM containerization is a framework that provides encapsulation and separation of the MDM components. The MDM system supports virtual device usage restrictions based on MDM policies and scoped commands (device level, container level). The scoped management of mobile device 104 by MDM server 102 enables additional security and management capabilities at the device level in addition to the individual container level. The MDM system applies MDM policies or actions across multiple devices and containers.

Embodiments described herein provide a loosely coupled MDM architecture. Specific industry customers require mobile device management and multiple heterogeneous operating systems on the same mobile device 104. Some organizations require security capabilities that support the integration of mobile devices 104 into enterprise networks for enterprise-owned devices (COPE), as well as user-owned devices (BYOD) systems.

Embodiments described herein implement access control to tighten MDM security control, for accessing data within the container and communication between containers on the devices. The MDM containerization provides different degrees of control over the work and personal data on mobile devices 104, ranging from full control over all data to specific control over work data only.

In some example embodiments, when the MDM server 102 sends commands (either device level or container level) to an MDM agent 204a, 204c, the MDM server 102 can associate or refer to the container instance by an ID pair (device_id, container_id). The purpose of this is to make sure that one container instance ID on one mobile device 104 is different from other container instance IDs on other mobile devices 104. The MDM server 102 refers to the container 202a, 202b, 202c by an ID pair.

There can be different types of container-level commands. Examples commands include granting access to physical resources (e.g. camera, WiFi, data/voice, GPS, microphone, audio) and application management (e.g. what applications are (dis)allowed to be installed in the container). Another example command is for certificates and credentials provisioning. This involves pushing trusted certificates, network certificates, WiFi certificates, passwords, and so on. A further example command requests information about the container or mobile device 104. The information can include a {container ID, device ID} pair. The information can include a managed_container_ID defined as [container ID|device ID] or concatenated IDs. The information can indicate the presence of any personal containers or any other security-related information relevant to the enterprise.

The MDM framework is able to manage multiple containers using multiple MDM agents. An enterprise can control the mobile device 104 using an MDM server 102 and commands.

The embodiments of the devices, systems and methods described herein may be implemented in a combination of both hardware and software. Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A process for management of a mobile device, the process comprising:

receiving, at a first agent residing within a first container of a plurality of containers residing on said mobile device, said containers sharing resources of said mobile device, each of said plurality of containers including an operating system running on a kernel of the mobile device, each container of the plurality of containers isolating data and processes residing in the container from data and processes residing in other containers of the plurality of containers residing on said mobile device, a first device level command and forwarding the first device level command to a controller residing in a host container of the plurality of containers residing on said mobile device;

receiving, at the first agent residing in the first container residing on said mobile device, a first container level command;

executing, by the first agent residing in the first container residing on said mobile device, the first container level command to control an operation of the first container; and executing, by a controller residing in the host container residing on said mobile device, the first device level command to control an operation of the mobile device for all of the plurality of containers residing on said mobile device.

2. The process of claim 1 further comprising receiving, by the first agent, a second container level command and executing, by the controller, the second container level command to control access to the resources of the mobile device by only the first container.

3. The process of claim 1 further comprising receiving the first container level command at the controller and forwarding the first container level command to the first agent.

4. The process of claim 1 further comprising converting, by the controller, the first device level command into a second container level command, and forwarding the second container level command to the first agent for execution, the second container level command to control access to resources of the mobile device by only the first container.

5. The process of claim 1 wherein the first container level command controls an operation of the first container by one of controlling access to one or more physical resources of the mobile device by only the first container, controlling configuration of only the first container, controlling management of an application for only the first container, controlling provisions of certificates and credentials for only the first container, and retrieving information about only the first container.

6. The process of claim 1 further comprising receiving, by the controller residing in the host container, a second device level command for retrieving information from the mobile device and receiving, by the first agent residing in the first container, a second container level command for retrieving information from the first container.

7. The process of claim 1 further comprising managing, by the controller, the plurality of containers on the mobile device, managing being at least one of creating, removing, disabling, enabling, resuming, saving and restoring one or more of the plurality of containers on the mobile device.

8. The process of claim 7 wherein the plurality of containers comprises a personal container and wherein the managing comprises disabling or enabling, by the controller, the personal container.

9. The process of claim 8 further comprising determining a status of the personal container, transmitting the status, and receiving a command for disabling or enabling the personal container based on the status.

10. The process of claim 1 wherein the plurality of containers includes a second container, and wherein the process further comprises receiving, by a second agent residing in the second container, a second container level command and, executing, by the second agent residing in the second container, the second container level command to control only the second container.

11. The process of claim 1 further comprising receiving the first container level command from a first server, and receiving the first device level command from a second server.

12. The process of claim 11 further wherein the first server and the second server are associated with different organizations.

13. The process of claim 1 further comprising determining, an execution status of the first container level command and the first device level command and transmitting a feedback response indicating the execution status.

14. The process of claim 1 further comprising transmitting a device identifier for the mobile device and a container identifier for the first container, the device identifier and the container identifier for receiving the first device level command and the first container level command.

15. The method of claim 1, wherein the execution of the first device level command controls the operation of the mobile device using libraries, the kernel, and the resources of the mobile device.

16. The method of claim 1, wherein executing, by the controller residing in the host container, the first device level command to control an operation of the mobile device for all the plurality containers comprises controlling access to the resources of the mobile device shared by the plurality of containers.

17. A mobile device comprising:
a plurality of containers residing on said mobile device, said plurality of containers sharing resources of the mobile device, each container of the plurality of containers residing on said mobile device comprising an operating system running on a kernel of the mobile device, each container of the plurality of containers isolating data and processes residing in the container from data and processes residing in other containers of the plurality of containers, the plurality of containers including a first container;
a physical communication interface to receive a first device level command and a first container level command;
at least one processor to configure:
a first agent residing in the first container of said plurality of containers residing on said mobile device, said first agent configured to receive the first container level command from the physical communication interface and to execute the first container level command to control an operation of the first container; and
a controller residing in a host container of the plurality of containers residing on said mobile device, said controller configured to receive the first device level command from the physical communication interface and to execute the first device level command to control an operation of the mobile device for all of the plurality of containers residing on said mobile device.

18. The mobile device of claim 17, wherein the physical communication interface receives a second container level command, and wherein the first agent receives the second container level command from the physical communication interface and the controller executes the second container level command to control access to the resources of the mobile device by only the first container.

19. The mobile device of claim 17, wherein the controller receives the first container level command and forwards the first container level command to the first agent.

20. The mobile device of claim 17, wherein the controller converts the first device level command into a second container level command, and forwards the second container level command to the first agent for execution, the second container level command to control access to the resources of the mobile device by only the first container.

21. The mobile device of claim 17, wherein the first container level command controls an operation of the first container by one of controlling access to one or more physical resources of the mobile device by only the first container, controlling configuration of only the first container, controlling management of an application for only the first container, controlling provisions of certificates and credentials for only the first container, and retrieving information about only the first container.

22. The mobile device of claim 17, wherein the physical communication interface receives a second device level command for retrieving information from the mobile device and a second container level command for retrieving information from the first container, and wherein the controller receives the second device level command from the physical communication interface and the first agent receives a second container level command from the physical communication interface.

23. The mobile device of claim 17, wherein the controller manages the plurality of containers on the mobile device by at least one of creating, removing, disabling, enabling, resuming, saving and restoring one or more of the plurality of containers on the mobile device.

24. The mobile device of claim 23 wherein the plurality of containers comprises a personal container and wherein the controller manages the plurality of containers on the mobile device by disabling or enabling, by the controller, the personal container.

25. The mobile device of claim 24, wherein the at least one processor is configured to determine a status of the personal container, transmit the status, and receive a command for disabling or enabling the personal container based on the status.

26. The mobile device of claim 17, wherein the first container level command is received from a first server, and the first device level command is received from a second server.

27. The mobile device of claim 17, wherein the at least one processor is configured to determine an execution status of the first container level command and the first device level command and transmit, using the physical communication interface, a feedback response indicating the execution status.

28. The mobile device of claim 17, wherein the at least one processor is further configured to transmit, using the physical communication interface, a device identifier for the mobile device and a container identifier for the first container, the device identifier and the container identifier for receiving the first device level command and the first container level command.

29. The mobile device of claim 17, wherein the execution of the first device level command controls the operation of the mobile device using libraries, the kernel, and the resources of the mobile device.

30. The mobile device of claim 17, wherein executing, by the controller residing in the host container, the first device level command to control an operation of the mobile device for all the plurality containers comprises controlling access to the resources of the mobile device shared by the plurality of containers.

* * * * *